(12) United States Patent
Wang et al.

(10) Patent No.: US 8,786,759 B2
(45) Date of Patent: Jul. 22, 2014

(54) METHOD AND APPARATUS FOR AUTO-FOCUS USING LIQUID CRYSTAL ADAPTIVE OPTICS

(75) Inventors: Dongxue Wang, Palatine, IL (US); Kevin W. Johnson, Mundelein, IL (US); Zhiming Zhuang, Kildeer, IL (US)

(73) Assignee: Motorola Mobility LLC, Chicago, IL (US)

( * ) Notice: Subject to any disclaimer, the term of this patent is extended or adjusted under 35 U.S.C. 154(b) by 583 days.

(21) Appl. No.: 11/846,061

(22) Filed: Aug. 28, 2007

(65) Prior Publication Data

US 2009/0059101 A1    Mar. 5, 2009

(51) Int. Cl.
*H04N 5/225*    (2006.01)
*H04N 5/232*    (2006.01)

(52) U.S. Cl.
USPC .......................................... 348/344; 348/345

(58) Field of Classification Search
USPC ......... 348/345, 361, 335–340, 359, 344, 343; 349/1, 45; 359/245, 484, 250, 251, 359/252, 266, 256, 259, 315, 316, 320
See application file for complete search history.

(56) References Cited

U.S. PATENT DOCUMENTS

| | | | |
|---|---|---|---|
| 5,091,795 A | 2/1992 | Nishioka et al. | |
| 5,097,352 A * | 3/1992 | Takahashi et al. | 349/57 |
| 5,150,234 A * | 9/1992 | Takahashi et al. | 349/1 |
| 5,359,444 A | 10/1994 | Piosenka et al. | |
| 5,471,343 A | 11/1995 | Takasugi | |
| 5,473,450 A | 12/1995 | Yamada et al. | |
| 5,815,233 A | 9/1998 | Morokawa et al. | |
| 6,723,392 B1 | 4/2004 | Jinnai et al. | |
| 6,778,246 B2 | 8/2004 | Sun et al. | |
| 6,816,217 B2 | 11/2004 | Sone | |
| 6,987,529 B1 | 1/2006 | Ito | |

(Continued)

FOREIGN PATENT DOCUMENTS

| | | |
|---|---|---|
| DE | 220147 A1 | 3/1985 |
| EP | 0354029 A2 | 2/1990 |

(Continued)

OTHER PUBLICATIONS

Patent Cooperation Treaty, "International Search Report and Written Opinion", ISA/KR, by Officer Kyong Chon Su, in PCT Application No. PCT/US2008/073972; Document of 10 pages dated Jan. 12, 2009.

(Continued)

*Primary Examiner* — Ahmed A Berhan
(74) *Attorney, Agent, or Firm* — Pablo Meles; Sylvia Chen (57) ABSTRACT

An auto-focus camera (100) can include a lens (102), a sensor (108) for detecting an image from the lens, a first liquid crystal layer (104) between the lens and the sensor, and a second liquid crystal layer (106) between the lens and the sensor and further orthogonally aligned to the first liquid crystal layer. The auto-focus camera can further include an integrated circuit programmed to drive the first liquid crystal layer and the second liquid crystal layer. The auto-focus camera can include a controller (202) programmed to control two orthogonally aligned liquid crystal layers. The liquid crystal layers can serve as an optical anti-alias filter using birefringence properties of the liquid crystal layers. The first liquid crystal layer and the second liquid crystal layer can be orthogonally aligned to achieve polarization insensitive operation of the auto-focus camera.

20 Claims, 4 Drawing Sheets

(56) References Cited

U.S. PATENT DOCUMENTS

| | | |
|---|---|---|
| 7,025,468 B2 | 4/2006 | Nishioka et al. |
| 7,580,619 B2 * | 8/2009 | Ootsuka et al. ............... 396/55 |
| 2002/0181120 A1 * | 12/2002 | Nagahara .................... 359/683 |
| 2002/0181126 A1 * | 12/2002 | Nishioka ..................... 359/726 |
| 2006/0164732 A1 | 7/2006 | Lee et al. |
| 2006/0170797 A1 | 8/2006 | Biernath et al. |
| 2007/0216851 A1 * | 9/2007 | Matsumoto .................. 349/200 |
| 2009/0169192 A1 | 7/2009 | Yang et al. |

FOREIGN PATENT DOCUMENTS

| | | |
|---|---|---|
| EP | 1291705 A2 | 12/2003 |
| EP | 1653257 A1 | 3/2006 |
| EP | 1840637 A2 | 10/2007 |
| JP | 2001249282 A | 9/2001 |
| JP | 2001272646 A | 10/2001 |
| JP | 2005128518 A | 5/2005 |
| JP | 2006227036 A | 8/2006 |
| JP | 200717934 A | 1/2007 |
| WO | 0125848 A2 | 4/2001 |
| WO | 0223263 A1 | 3/2002 |
| WO | 2005081038 | 9/2005 |

OTHER PUBLICATIONS

Li et al., "Switchable Electro-Optic Diffractive Lens with High Efficiency for Ophtalmic Applications", Apr. 18, 2006, 6100-6104, vol. 103, The National Academy of Sciences of the USA.

Paul F. McManamon et al., "Optical Phased Array Technology", Proc. of the IEEE, vol. 84 No. 2, Feb. 1996, pp. 268-298.

Patent Cooperation Treaty, "International Search Report and Written Opinion of the International Searching Authority" for International Application No. PCT/US2008/087909, Mar. 18, 2009, 12 pages.

United States Patent and Trademark Office, "Non-Final Rejection" for U.S. Appl. No. 11/967,598, Jan. 13, 2010, 12 pages.

United States Patent and Trademark Office, "Notice of Allowance and Fee(s) Due" for U.S. Appl. No. 11/967,598, Aug. 10, 2010, 4 pages.

Russian Agency for Patent and Trademarks (Rospatent), "Official Action" for Russian Pat. Appln. No. 2010132249-20(045605), Aug. 30, 2010, 4 pages.

United States Patent and Trademark Office, "Notice of Allowance and Fee(s) Due" for U.S. Appl. No. 11/967,598, Dec. 16, 2010, 10 pages.

European Patent Office, "Supplementary European Search Report" for EP Pat. Appln. No. 08870415.0, Jan. 20, 2011, 4 pages.

Chinese State Intellectual Property Office (SIPO), "First Office Action" for Chinese Patent Application No. 200880123610.3, Aug. 10, 2011, 15 pages.

European Patent Office, Office Action for International Application No. 08870415.0, Sep. 15, 2011, 4 pages.

Federal Service on Industrial Property, Patents and Trade Marks, "Decision on Grant of a Patent for Invention" for Russian Patent Application No. 2010111732, Aug. 23, 2012, 12 pages.

European Patent Office, "Extended European Search Report", for EP Appln. No. 08798451.4, Dec. 30, 2011, 6 pages.

* cited by examiner

METHOD AND APPARATUS FOR AUTO-FOCUS USING LIQUID CRYSTAL ADAPTIVE OPTICS

FIELD

This invention relates generally to auto-focusing, and more particularly to auto-focusing liquid crystal adaptive optics.

BACKGROUND

High resolution mega-pixel cameras use a focusing function to take high quality pictures. Most Auto-focusing methods involve mechanical moving parts such as step motors which add complexity in hardware and software design. Electro-wetting liquid lenses and liquid crystal lenses belong to the category of adaptive optics, where the optical wave front is adjusted without the aid of mechanical movement. In the case of the liquid crystal lens, the optical wave-front change is achieved through a gradient change of a refractive index which is electrically tuned by an external voltage. Even though adaptive optics might avoid the use of mechanical moving parts, existing camera arrangements and imagers using adaptive optics have issues and challenges for implementation in an auto-focus type camera.

As noted above, mechanical parts are generally used with cameras having auto-focus features. Several U.S. patents discuss the use of adaptive optics using liquid crystal lenses, but fail to address issues with polarization and birefringence that result from using liquid crystal lenses. Birefringence, or double refraction, is the decomposition of a ray of light into two rays (the ordinary ray and the extraordinary ray) when it passes through certain types of material, such as calcite crystals, depending on the polarization of the light. Polarization is the property of electromagnetic waves, such as light, that describes the direction of their transverse electric field. More generally, the polarization of a transverse wave describes the direction of oscillation in the plane perpendicular to the direction of travel.

For example, U.S. Pat. No. 5,359,444 discusses a conceptual liquid crystal lens based eyeglass with auto-focus that failed to address polarization and birefringence issues from the liquid crystal material. Likewise, U.S. patent application 2006/0164732 A1 proposed a liquid crystal lens for optical zooming and U.S. Pat. No. 5,815,233 proposed a system level of liquid crystal lens for optical information processing for coherent light application. Each failed to appropriately address polarization and birefringence. A publication sponsored by the National Academy of Sciences (0600850103), published on Apr. 18, 2006 discusses the use of a diffractive liquid crystal lens to implement eyeglass auto-focus.

SUMMARY

Embodiments in accordance with the present invention can provide a method and device that enables a simple and effective solution to implement camera auto-focus using liquid crystal technology without mechanical moving parts. Such an arrangement offers compactness and design simplification not currently provided by existing technology. In a particular arrangement, two cascaded orthogonal liquid crystal plates are used without optical power and any polarizer in a camera for auto-focus and optical anti-alias filter applications. As previously noted, this auto-focus method does not necessarily involve mechanical moving parts.

In a first embodiment of the present invention, an auto-focus camera can include a lens, a sensor for detecting an image from the lens, a first liquid crystal layer between the lens and the sensor, and a second liquid crystal layer between the lens and the sensor and further orthogonally aligned to the first liquid crystal layer. In one embodiment, a fast optical axis of the second liquid crystal layer can be orthogonally aligned to a fast optical axis of the first liquid crystal layer. The camera can include an infrared filter to block infrared light for a camera used to take visible images. The liquid crystal layers can each be less than 0.25 millimeters thick. The auto-focus camera can further include an integrated circuit programmed to drive or apply different voltages to the first liquid crystal layer and the second liquid crystal layer, respectively, according to different focusing distances. The auto-focus camera can include a controller programmed to orthogonally align a polarization of the first liquid crystal layer with the second liquid crystal layer. The controller can alternatively be programmed to control two orthogonally aligned liquid crystal phase modulators. In one arrangement, the sensor can be a CMOS sensor where one or both liquid crystal layers are integrated with the CMOS sensor. Also, the CMOS sensor and liquid crystal layers can be discrete components. The liquid crystal layers can serve as an optical anti-alias filter using birefringence properties of the liquid crystal layer or layers. The first liquid crystal layer and the second liquid crystal layer can be orthogonally aligned to achieve polarization insensitive operation of the auto-focus camera. The first liquid crystal layer and the second liquid crystal layer can electrically adjust a refractive index for extraordinary (p) waves by changing external voltages to modulate light polarization directions. The camera can be part of any number of devices including a cellular phone, a personal digital assistant, a smart phone, an MP3 Player, a music player, a remote controller, a wrist-worn computer, or a watch. "Orthogonally aligned" as used herein can generally mean that the liquid crystal cells have optical axes that are aligned orthogonally in construction or through electronic manipulation.

In a second embodiment of the present invention, a system for electronic auto-focus can include a lens, a sensor for detecting an image from the lens, a first liquid crystal layer between the lens and the sensor, a second liquid crystal layer between the lens and the sensor, and a controller programmed to change external voltages applied to first and second liquid crystal layers which are orthogonally aligned using feedback from an auto focusing processor. The sensor can be a CMOS sensor and at least the first liquid crystal layer or the second liquid crystal layer or both can be integrated with the CMOS sensor as part of a high resolution mega-pixel camera. The first liquid crystal layer and the second liquid crystal layer act as an optical anti-alias filter using birefringence. The system can further optionally include a quarter-wave plate inserted between the first and second liquid crystal layer and an infrared filter between the lens and the liquid crystal layers to block infrared light for a camera used to take visible images. Note, the quarter-wave plate can have an optical axis arranged 45 degrees relative to a linear polarization direction that converts a linear polarization into a circular polarization.

In a third embodiment of the present invention, a method for auto-focusing can include the steps of capturing an image through a lens and a sensor and orthogonally phase modulating a first liquid crystal layer relative to a second liquid crystal layer, where the first liquid crystal layer and the second liquid crystal layer reside between the lens and the sensor. In general, light can be decomposed in two orthogonal polarizations. Orthogonally phase modulating can mean simply phase modulating the two polarizations of light passing through two liquid crystal cells whose optical axis are already orthogonally aligned, and each of the two polarizations is modulated by the two liquid crystal cells, respectively. Moreover, the phase modulation is achieved by altering the refractive index of the ex-ordinary light (p waves) in each liquid crystal cell according to different voltage applied to the liquid crystal. The method of auto-focusing can be done automatically. The method can further include the step of optical anti-alias filtering using a birefringence effect of the first liquid crystal layer and the second liquid crystal layer. The method can also provide a protective cover to the sensor by integrating the first liquid crystal layer or the second liquid crystal layer or both layers with the sensor. The integrated circuits (ICs) for controlling the two liquid crystal layers and a CMOS imager can be combined and integrated into a common IC. The method further performs an auto-focus function and an optical anti-aliasing function simultaneously. The method can further include the step of orthogonally aligning and modulating the first liquid crystal layer and the second liquid to achieve polarization insensitive auto-focusing. The method can also include the step of electronically adjusting a refractive index for extraordinary (p) waves using the first liquid crystal layer and the second liquid crystal layer respectively. The method can further include the step of varying a liquid crystal refractive index by applying spatial position dependent external voltages to at least one among the first liquid crystal layer and the second liquid crystal layer.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "Auto-Focus" (or AF) or Auto-Focus processor is a feature or a processor of some optical systems that allows them to obtain (and in some systems to also continuously maintain) correct focus on a subject, instead of requiring the operator to adjust focus manually. Autofocus systems rely on one or more sensors to determine correct focus. Some AF systems rely on a single sensor, while others use an array of sensors. A "sensor" or "image sensor" is a device that converts a visual image to an electric signal. It is used chiefly in digital cameras and other imaging devices. It is usually an array of charge-coupled devices (CCD) or CMOS sensors such as active pixel sensors. "Spatial position dependent external voltage" indicates an applied external voltage to a device that alters the functionality of the device based on the location where the voltage is applied. A lens generally means a transparent object with two refracting surfaces. Usually the surfaces are flat or spherical (spherical lenses). Sometimes, to improve image quality, lenses are deliberately made with surfaces which depart slightly from spherical. A lens usually refers to a series of separate glass or plastic lenses such as a lens on a camera that focuses light from an object onto the image plane to create an image. An image is difficult to define, but as used herein can generally mean a visual representation (of an object or scene or person or abstraction) typically produced on a surface. An image can also mean a point mapping of luminous points of an object located in one region of space to points in another region of space, formed by refraction or reflection of light in a manner which causes light from each point of the object to converge to or diverge from a point somewhere else (on the image). A liquid crystal layer or cell as used herein can generally be thought of as a layer of liquid crystals, often sandwiched between two substrates, where the liquid crystals are substances that exhibit a phase of matter that has properties between those of a conventional liquid, and those of a solid crystal. For instance, a liquid crystal (LC) may flow like a liquid, but have the molecules in the liquid arranged and/or oriented in a crystal-like way. In optics, the term optical axis is used to define a direction along which there is some degree of rotational symmetry. In an optical systems, the optical axis is an imaginary line that defines the path along which light propagates through the system. For a system composed of simple lenses and mirrors, the axis passes through the center of curvature of each surface, and coincides with the axis of rotational symmetry. The optical axis is often coincident with the system's mechanical axis, but not always, as in the case of off-axis optical systems. In an uniaxial birefringent material, the optical axis is the axis defined by optical anisotropy, and no birefringence happens if light propagates along the optical axis. In terms of liquid crystal, the optical axis is the projection of the LC symmetry axis to the LC layer surface, i.e., the statistical mean of the LC molecule axis orientations.

The terms "program," "software application," "resizing program" and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Other embodiments, when configured in accordance with the inventive arrangements disclosed herein, can include a system for performing and a machine readable storage for causing a machine to perform the various processes and methods disclosed herein.

DETAILED DESCRIPTION OF THE DRAWINGS

While the specification concludes with claims defining the features of embodiments of the invention that are regarded as novel, it is believed that the invention will be better understood from a consideration of the following description in conjunction with the figures, in which like reference numerals are carried forward.

Embodiments herein can be implemented in a wide variety of ways using a variety of technologies that enable not only the manufacture of an auto-focus camera, but the means of auto-focusing. These cameras will generally have no moving mechanical parts and can enable auto-focusing through the refractive index variation caused by an applied voltage to a liquid crystal plate. Such arrangements also allow the overall volume of the camera to be reduced.

An operation condition of low voltage, 2.5 V and fast response time less than 1 second is achievable using this device. Referring to the auto-focus camera 100 of FIG. 1, two liquid crystal (LC) layers 104 and 106 are sandwiched between a lens 102 and a sensor 108. To improve un-polarized light transmission, the two LC layers 104 and 106 have orthogonal alignment directions used to achieve polarization insensitive operation. (See the liquid crystal molecules 111 in the respective LC layers 104 and 106). Since there is no polarizer involved and no absorption from the LC layers, both s (ordinary) and p (extraordinary) waves can pass through the two LC layers easily. Also, only the refractive index of an extraordinary wave is modulated. The LC refractive index variation can be localized using spatial position dependent external voltages 110 and 112 to balance lens field curvature. The focusing is simply achieved by electrical switch without any additional hardware and software involved. Moreover, the LC plate can be integrated with a CMOS sensor array (such as sensor 108) to act as its protection layer. Further note that the birefringence effect of an LC layer can be used to implement optical anti-alias filtering. The camera or system 100 can further include an infrared (IF) filter 103 to block infrared light for a camera used to take visible images. The IF filter 103 can be placed between the lens 102 and the LC layers as shown or between the LC layers and the sensor 108. The camera or system 100 can further include a quarter-wave plate 105 inserted between the first and second liquid crystal layers.

Figure 1:
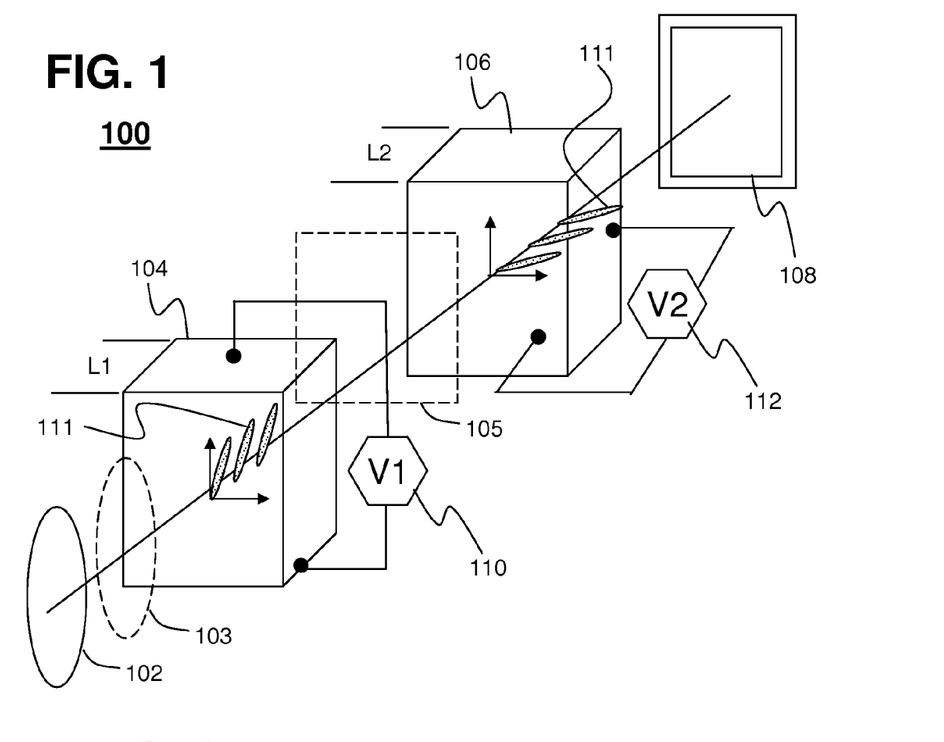
FIG. 1 is an exploded view of an auto-focus camera in accordance with an embodiment of the present invention.

The electrically modulated LC layer can be positioned close to the back focus plane. The refractive index variation of the LC layer will effectively change the lens back focus plane to match imagine plane variation from targets at different distances from the camera. As a result, high resolution Auto-focusing can be implemented.

Referring again to FIG. 1, the LC layer 104 and voltage 110 and the LC layer 106 and voltage 112 serve as two orthogonal LC phase modulators to achieve single path auto focus for imagers. The optical paths for p and s waves are defined as follows:

Optical path $p(OPP) = L1*n(V1) + L2*n0$

Optical path $s(OPS) = L1*n0 + L2*n(V2)$ where L1 is the thickness of a first liquid crystal cell or layer and L2 is the thickness of a second liquid crystal cell or layer and "n" is the index of refraction for an ex-ordinary (e) light, and "n0" is the index of refraction for an ordinary (o) light. Also, the e (o) light in liquid crystal cell 1 becomes o (e) light in liquid crystal cell 2 because the optical axes of the two liquid crystal cells are orthogonal.

Since there is always a small difference between L1 and L2 in production, to achieve the same focal length for both s and p waves, OPP should equal OPS. Which results in:

$n(V2) = n0*(L2-L1)/L2 + n(V1)*L1/L2.$

This relationship between V2 and V1 can be programmed (over the air or otherwise) into the LC phase modulators (or stored in a look up table) before shipping out of a factory.

Figure 2:
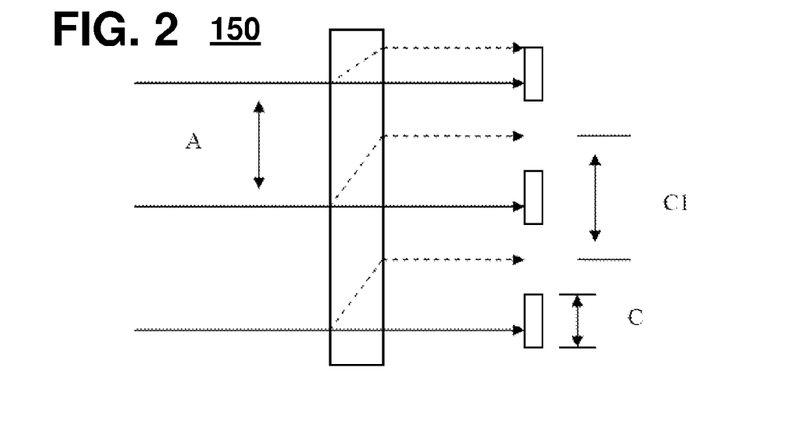
FIG. 2 is an illustration of detector width and an effective width of the detector in accordance with an embodiment of the present invention.

Referring to FIG. 2, which illustrates 1-D anti-aliasing from liquid crystal cells in FIG. 1 in a detector array. The dashed line represents extraordinary light (e-light) and the solid line represents ordinary light (o-light). Symbol A represents the pitch of detector array, C represents the actual or physical size of the detect cell, and C1 represents the effective size of detector cell due to birefringence. Since birefringence generally splits the incident light into two separate beams, it increases the effective width of the detect cell, i.e, the pixel size of a CMOS or CCD array. In general, the size of detect cell, C determines the maximum spatial frequency, the cut-off spatial frequency the CMOS imager can pass, which ultimately affects the imaging resolution. This cut-off frequency is inversely proportional to C. On the other hand, the pitch of detector array, A, i.e., center to center spacing of adjacent detector cells corresponds to the inverse of a sampling rate, and one-half of this sampling rate is defined as the Nyquist frequency, where the maximum analog frequency can be recovered from the digital sampling. Because A is larger than C, this under-sampling causes aliasing. The increased effective size (C1) of the detector cell from the birefringence can cause anti-aliasing. Moreover, a color filter is usually embedded with a detector array, and the detect pitch for different colors, red, green and blue vary, which causes color aliasing, i.e., the black and white target can become a colored image. This color aliasing can be eliminated by the anti-aliasing technique.

Figure 3:
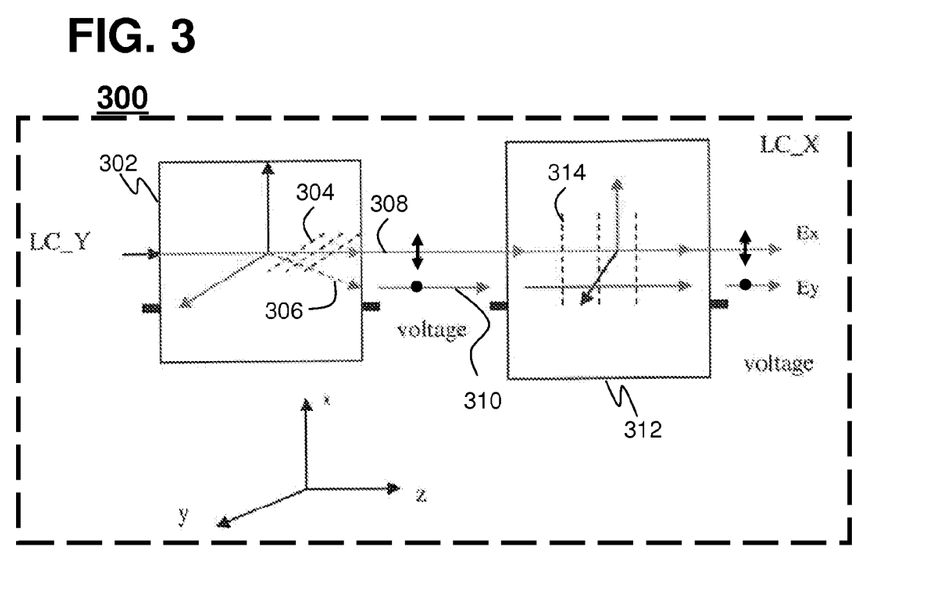
FIG. 3 is an illustration of a system of liquid crystal cells demonstrating the refractive index modulation by an applied voltage in accordance with an embodiment of the present invention.

As illustrated in the system 300 of FIG. 3, birefringence is the result of different refractive indices for different polarizations. That is, the impact of dispersion (or the refractive index) is different for different types of polarizations. This difference is called birefringence, and the birefringence can split one incident beam into two separate beams. Note, a liquid crystal layer or cell 302 (LC_Y) having its director 304 in a yz plane only modulates (306) the refractive index of Ey, (polarization along y axis). As a result, the light becomes polarized after passing LC_Y 302, and is split into extraordinary light (e-light, Ey 310 in case of LC_Y) and ordinary light (o-light, Ex 308 in case of LC_Y), so called birefringence.

After passing LC-Y 302, the light is split by birefringence. Likewise, a liquid crystal layer or cell 312 (LC-X) having its LC director 314 in the xz plane, only modulates the refractive index of Ex. And, the light is spread out along the horizontal direction y after passing LC_Y 312. As a result, anti-aliasing is implemented along the horizontal direction (the y direction).

By proper selection of the LC layer thickness of these two cells, the effective optical path of Ex and Ey passing these two LC cells can be made the same. In other words, the total light passing these two cells can have the same optical path. The total optical path will be dependent on the applied voltage, which is simultaneously applied to both cells.

Figure 4:
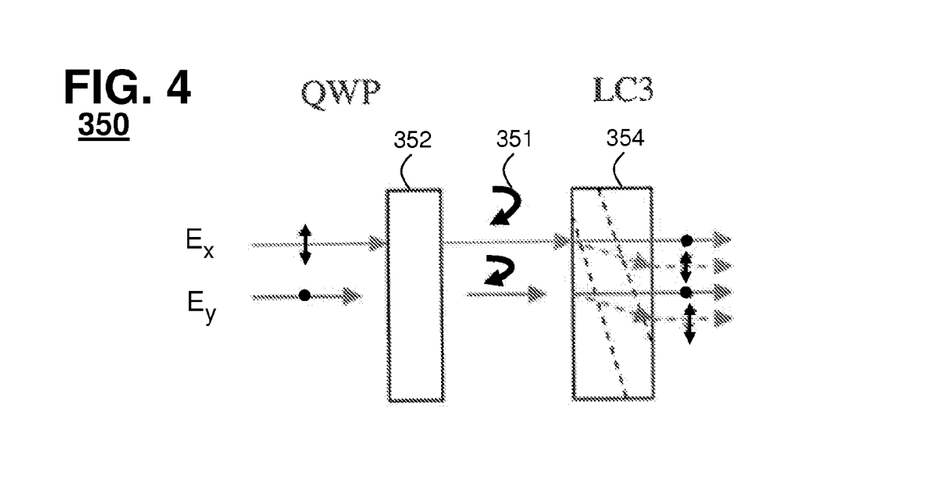
FIG. 4 is an illustration of a system for two-dimensional anti-aliasing using a quarter-wave plate in accordance with an embodiment of the present invention.

Referring to FIGS. 3 and 4, a system 350 for two-dimensional anti-aliasing can be achieved by adding a quarter-wave plate 352 and a third liquid crystal layer or cell 354 or other optical crystal without an external voltage. The Ex and Ey linearly polarized light from the second LC layer (from LC_X layer 312 of FIG. 3) becomes circularly polarized light (351) after passing the quarter wave plate 352 whose optical axis can be 45 degrees relative to the vertical axis x. The other liquid crystal cell 354 or other types of optical crystals can be positioned after the quarter-wave plate 352. The light is spread out along the vertical direction (x), so the two dimensional anti-aliasing is achieved after light passing the first two LC cells (302 and 312), the quarter-wave plate 352, and the third LC cell 354. The third LC cell 354 only needs a constant voltage bias to make its optical axis to align in a certain direction. The third LC cell 354 can be replaced with other types of uniaxial optical crystals that can operate without the use of an applied voltage. The uniaxial optical crystal can be a uniaxial transparent optical crystal, such as a quartz liquid crystal with its optical axis in a xz plane by proper crystal cutting. In such an arrangement, the quarter-waveplate can be positioned between the optical crystal and the second LC layer, and the first LC layer performs the anti-aliasing in the y direction, and this optical crystal can implement anti-aliasing in the x direction In another embodiment of the present invention as illustrated in the diagrammatic representation of FIG. 5, an electronic product such as a machine (e.g., a camera, a cellular phone, a laptop, a PDA, etc.) having a auto-focus camera or lens or feature 210 can include a controller 202 coupled to the feature 210. Generally, in various embodiments it can be thought of as a machine in the form of a computer system 200 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. For example, the computer system can include a recipient device 201 and a sending device 250 or vice-versa.

The machine may comprise a server computer, a client user computer, a personal computer (PC), a tablet PC, personal digital assistant, a cellular phone, a laptop computer, a desktop computer, a control system, a network router, switch or bridge, or any machine capable of executing a set of instructions (sequential or otherwise) that specify actions to be taken by that machine, not to mention a mobile server. It will be understood that a device of the present disclosure includes broadly any electronic device that provides voice, video or data communication or presentations. Further, while a single machine is illustrated, the term "machine" shall also be taken to include any collection of machines that individually or jointly execute a set (or multiple sets) of instructions to perform any one or more of the methodologies discussed herein.

Figure 5:
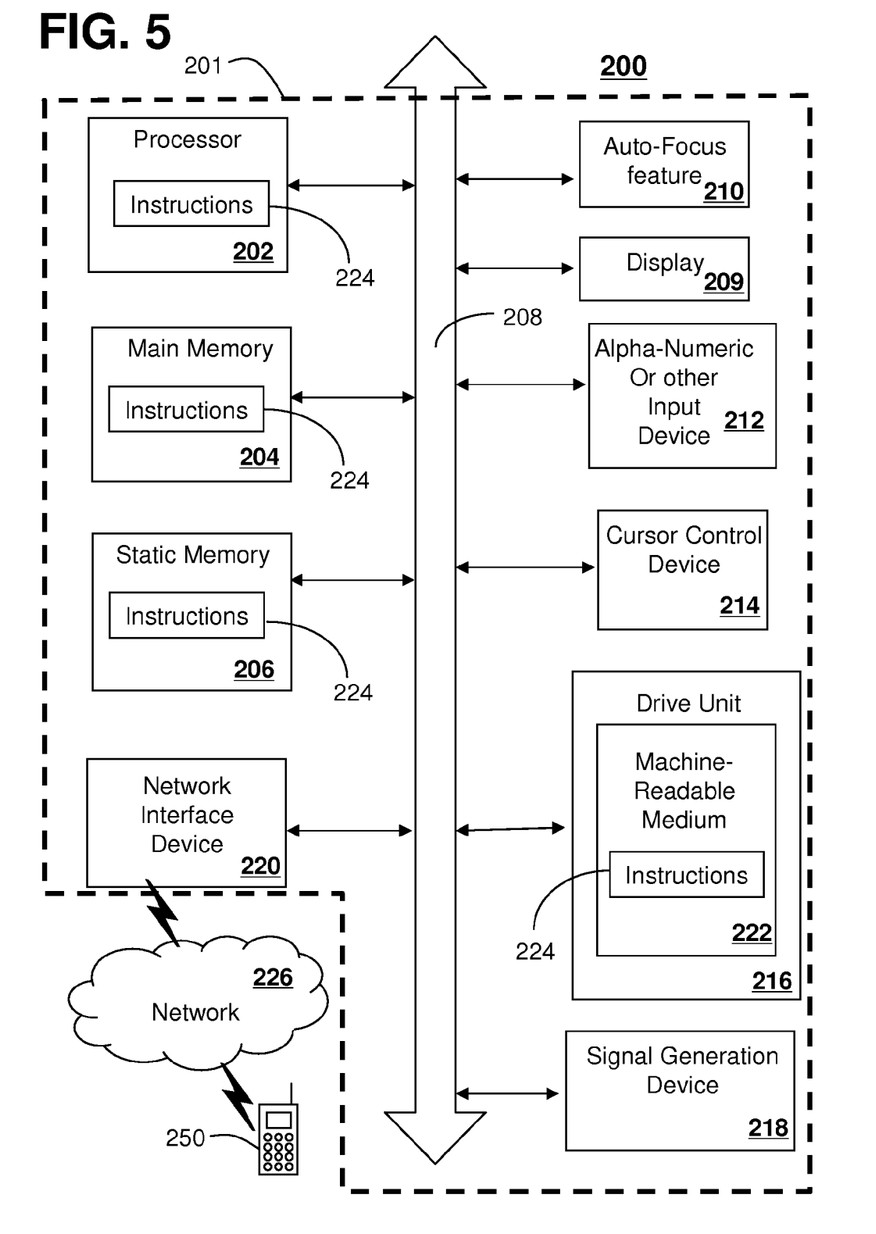
FIG. 5 is a block diagram of an electronic device in accordance with an embodiment of the present invention.

The computer system 200 can include a controller or processor 202 (e.g., a central processing unit (CPU), a graphics processing unit (GPU, or both), a main memory 204 and a static memory 206, which communicate with each other via a bus 208. The computer system 200 may further include a presentation device such the display 209. The computer system 200 may include an input device 212 (e.g., a keyboard, microphone, etc.), a cursor control device 214 (e.g., a mouse), a disk drive unit 216, a signal generation device 218 (e.g., a speaker or remote control that can also serve as a presentation device) and a network interface device 220. Of course, in the embodiments disclosed, many of these items are optional.

The disk drive unit 216 may include a machine-readable medium 222 on which is stored one or more sets of instructions (e.g., software 224) embodying any one or more of the methodologies or functions described herein, including those methods illustrated above. The instructions 224 may also reside, completely or at least partially, within the main memory 204, the static memory 206, and/or within the processor or controller 202 during execution thereof by the computer system 200. The main memory 204 and the processor or controller 202 also may constitute machine-readable media.

Dedicated hardware implementations including, but not limited to, application specific integrated circuits, programmable logic arrays, FPGAs and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but are not limited to, distributed processing or component/object distributed processing, parallel processing, or virtual machine processing can also be constructed to implement the methods described herein. Further note, implementations can also include neural network implementations, and ad hoc or mesh network implementations between communication devices.

The present disclosure contemplates a machine readable medium containing instructions 224, or that which receives and executes instructions 224 from a propagated signal so that a device connected to a network environment 226 can send or receive voice, video or data, and to communicate over the network 226 using the instructions 224. The instructions 224 may further be transmitted or received over a network 226 via the network interface device 220.

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

Figure 6:
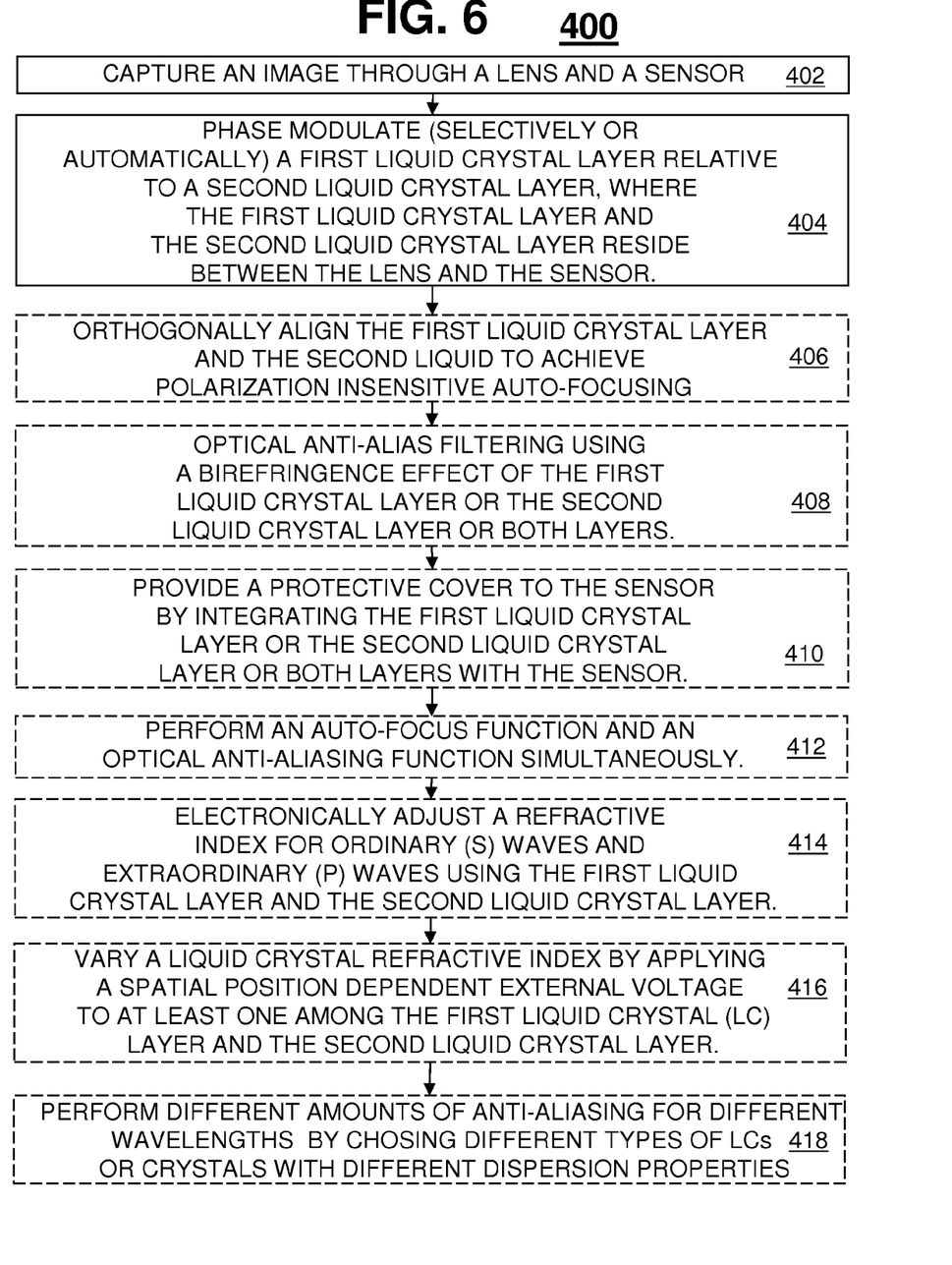
FIG. 6 is flow chart illustrating a method of auto-focusing in accordance with an embodiment of the present invention.

Referring to FIG. 6, a method 400 for auto-focusing can include the step 402 of capturing an image through a lens and a sensor and orthogonally phase modulating a first liquid crystal layer relative to a second liquid crystal layer at step 404, where the first liquid crystal layer and the second liquid crystal layer reside between the lens and the sensor. The step of orthogonally phase modulating can be done selectively or automatically. The method 400 can further include the step 406 of orthogonally aligning the first liquid crystal layer and the second liquid to achieve polarization insensitive auto-focusing. The method 400 can further include the step 408 of optical anti-alias filtering using a birefringence effect of the first liquid crystal layer or the second liquid crystal layer or both layers. The method 400 can also provide a protective cover to the sensor by integrating the first liquid crystal layer or the second liquid crystal layer or both layers with the sensor at step 410. The method 400 can further optionally perform an auto-focus function and an optical anti-aliasing function simultaneously at step 412. The method 400 can also include the step 414 of electronically adjusting a refractive index for ordinary (s) waves and extraordinary (p) waves using the first liquid crystal layer and the second liquid crystal layer. The method 400 can further include the step 416 of varying a liquid crystal refractive index by applying a spatial position dependent external voltage to at least one among the first liquid crystal layer and the second liquid crystal layer. The method at step 418 can further perform different amounts of anti-aliasing for different wavelengths (colors) by selecting different types of liquid crystals or optical crystals with different dispersion properties.

Note, the optical axes of the first liquid crystal layer and the second liquid crystal layer are orthogonally aligned in construction through a surface treatment of a liquid crystal substrate for the first and second liquid crystal layers. The surface treatment can be a modification, such as unidirectional rubbing of a polyimide coating or polarized light irradiation of a photo-polymer coating, of a surface or surfaces in a particular orientation to achieve the anisotropic alignment of the liquid crystal. Further note, the controller can be programmed to change external voltages applied to the first liquid crystal layer and the second liquid crystal layer using feedback from an auto focusing processor such that the optical path of the first liquid crystal layer and the second liquid crystal layer for two orthogonal polarized lights are identical. Orthogonal polarized lights can mean two separate light beams that are orthogonally polarized. Note, beam-splitting polarizers can split an incident beam into two beams of differing polarization. For an ideal polarizing beamsplitter these would be fully polarized with orthogonal polarizations. In another aspect, the optical axis of the first liquid crystal layer can be in an xz plane, and its external voltage can be used to change the refractive index of light component with polarization along an X direction, the extraordinary polarization component passing through the first liquid crystal layer and where the optical axis of the second liquid crystal layer can be in a yz plane, and its external voltage can be used to change a refractive index of light component with polarization along a y direction, the extraordinary polarization component passing through the second liquid crystal layers, where the first and second liquid crystal layers collectively perform orthogonal phase modulations. Further note, a voltage applied to each of the first and the second liquid crystal layers can be substantially uniform and spatially dependent in different rings or grids across liquid crystal layers such that an image enhancement is achieved for different locations including image corners or edges.

Regarding a "fast" axis, light entering an optical crystal such as a wave plate can be decomposed into two waves with orthogonal polarizations, parallel and perpendicular to the optical axis of a wave plate. Inside the plate, the two waves propagate at different speeds, ie, with different refractive indices. As a result, there are fast and slow axes to define different directions of light propagations. A wave plate or retarder is an optical device that alters the polarization state and phase of a light wave traveling through it. A wave plate works by shifting the phase of a light wave between two perpendicular polarization components. A typical wave plate is simply a birefringent crystal with a carefully chosen thickness. The crystal is cut so that the extraordinary axis (polarized parallel to the axis of anisotropy) is parallel to the surfaces of the plate. When the extraordinary index is smaller than the ordinary (polarized perpendicularly to axis of anisotropy) index, as in calcite, the extraordinary axis is called the fast axis and the ordinary axis is called the slow axis. Light polarized along the fast axis propagates faster than light polarized along the slow axis. Thus, depending on the thickness of the crystal, light with polarization components along both axes will emerge in a different polarization state. The wave plate is characterized by the amount of relative phase $\Gamma$ that it imparts on the two components, which is related to the birefringence $\Delta n$ and the thickness L of the crystal by the formula:

$$\Gamma = 2\pi \Delta n L / \lambda.$$

For instance, a quarter-wave plate creates a quarter wavelength phase of 90 degrees shift and can change linearly polarized light to circular and vice versa. This is done by adjusting the plane of the incident light so that it makes a 45° angle with the fast axis. This gives equal amplitude ordinary and extraordinary waves. The other common type of wave plate is a half-wave plate, which retards one polarization by a half wavelength, or 180 degrees of phase change. This type of wave plate rotates the polarization direction of linear polarized light.

In light of the foregoing description, it should be recognized that embodiments in accordance with the present invention can be realized in hardware, software, or a combination of hardware and software. A network or system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. An auto-focus camera, comprising:
 a lens;
 a sensor for detecting an image from the lens;
 a first liquid crystal layer between the lens and the sensor for passing waves in two orthogonal polarizations and for adjusting a refractive index for extraordinary (p) waves; and
 a second liquid crystal layer between the lens and the sensor where an optical axis of the second liquid crystal layer is orthogonally aligned to an optical axis of the first liquid crystal layer for passing waves in two orthogonal polarizations,
 wherein the first liquid crystal layer and the second liquid crystal layer are flat surface liquid crystal elements.

2. The auto-focus camera of claim 1, wherein the auto-focus camera further comprises an integrated circuit programmed to apply different voltages to the first liquid crystal layer and the second liquid crystal layer, respectively, to alter the optical path through each liquid crystal layer according to different focusing distances, such that the optical path of the first liquid crystal layer and the optical path for the second liquid crystal layer for orthogonal polarized light are identical.

3. The auto-focus camera of claim 1, wherein the auto-focus camera further comprises a controller to program two orthogonally aligned liquid crystal phase modulators and an infrared filter to block infrared light for a camera used to take visible images.

4. The auto-focus camera of claim 1, wherein the sensor is a CMOS sensor and wherein the first liquid crystal layer or the second liquid crystal layer or both are either integrated with the CMOS sensor or discrete components.

5. The auto-focus camera of claim 4, wherein the first liquid crystal layer and the second liquid crystal layer act as an optical anti-alias filter using birefringence in both horizontal and vertical directions.

6. The auto-focus camera of claim 1, wherein the optical paths of the first liquid crystal layer and the second liquid crystal layer for two orthogonal polarized lights are identical.

7. The auto-focus camera of claim 1, wherein the auto-focus camera is a part of a cellular phone, a personal digital assistant, a smart phone, an MP3 Player, a music player, a remote controller, a wrist-worn computer, or a watch.

8. The auto-focus camera of claim 1, wherein the first liquid crystal layer and the second liquid crystal layer are each less than 0.25 millimeters thick and wherein a liquid crystal refractive index variation is localized using spatial position dependent external voltages to balance lens field curvature.

9. A system for electronic auto-focus, comprising:
a lens;
a sensor for detecting an image from the lens;
a first liquid crystal layer between the lens and the sensor for passing waves in two orthogonal polarizations and for electronically adjusting a refractive index for extraordinary (p) waves;
a second liquid crystal layer between the lens and the sensor for passing waves in two orthogonal polarizations wherein the optical axes of the first liquid crystal layer and the second liquid crystal layer are orthogonally aligned in construction through a surface treatment of a liquid crystal substrate for the first and second liquid crystal layers and wherein the first liquid crystal layer and the second liquid crystal layer are flat surface liquid crystal elements; and
a controller programmed to change external voltages applied to the first liquid crystal layer and the second liquid crystal layer to alter the optical path through each liquid crystal layer using feedback from an auto focusing processor, such that the optical path of the first liquid crystal layer and the second liquid crystal layer for two orthogonal polarized lights are identical.

10. The system of claim 9, wherein the system further comprises a quarter-wave plate inserted between the first and second liquid crystal layer and an infrared filter between the lens and the liquid crystal layers to block infrared light for a camera used to take visible images, wherein the quarter-wave plate has an optical axis arranged 45 degrees relative to a linear polarization direction that converts a linear polarization into a circular polarization.

11. The system of claim 10, wherein a voltage applied to each of the first and the second liquid crystal layers are substantially uniform and spatially dependent in different rings or grids across liquid crystal layers such that an image enhancement is achieved for different locations including image corners or edges.

12. The system of claim 9, wherein the sensor is a CMOS sensor and wherein the first liquid crystal layer or the second liquid crystal layer or both are integrated with the CMOS sensor as part of a high resolution mega-pixel camera.

13. A method for auto-focusing, comprising the steps of:
capturing an image through a lens and a sensor; and
orthogonally phase modulating a first liquid crystal layer and a second liquid crystal layer that reside between the lens and the sensor, wherein the first liquid crystal layer and the second liquid crystal layer pass waves in two orthogonal polarizations and are flat surface liquid crystal layers; and
electrically adjustinq a refractive index for extraordinary (p) waves using the first liquid crystal layer and the second liquid crystal layer respectively such that the optical path of the first liquid crystal layer and the second liquid crystal layer for two orthogonal polarized lights are identical.

14. The method of claim 13, wherein the method of auto-focusing is done automatically and continuously.

15. The method of claim 13, wherein the method further comprises the step of optical anti-alias filtering using a birefringence effect of the first liquid crystal layer and the second liquid crystal layer.

16. The method of claim 13, wherein the method further comprises the step of providing a protective cover to the sensor by integrating at least one among the first liquid crystal layer or the second liquid crystal layer with the sensor.

17. The method of claim 13, wherein the method further performs continuous auto-focus function and an optical anti-aliasing function simultaneously.

18. The method of claim 13, wherein the method further comprises the step of orthogonally aligning and modulating the first liquid crystal layer and the second liquid crystal layer.

19. The method of claim 13, wherein the method further comprises the step of varying a liquid crystal refractive index by applying spatial position dependent external voltages to the first liquid crystal layer or the second liquid crystal layer or both.

20. The method of claim 13, wherein the method further comprises performing different amounts of anti-aliasing for different wavelengths or colors by selecting different types of liquid crystals or optical crystals with different dispersion properties.

* * * * *